(12) United States Patent
Slegers

(10) Patent No.: US 12,010,779 B2
(45) Date of Patent: Jun. 11, 2024

(54) IMPROVING AUTOMATION RULES BY DETERMINING A RELATIONSHIP BETWEEN EVENTS AND CONTROL COMMANDS

(71) Applicant: SIGNIFY HOLDING B.V., Eindhoven (NL)

(72) Inventor: Walter Jeroen Slegers, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 268 days.

(21) Appl. No.: 17/429,958

(22) PCT Filed: Feb. 11, 2020

(86) PCT No.: PCT/EP2020/053441
§ 371 (c)(1),
(2) Date: Aug. 11, 2021

(87) PCT Pub. No.: WO2020/165153
PCT Pub. Date: Aug. 20, 2020

(65) Prior Publication Data
US 2022/0132641 A1 Apr. 28, 2022

(30) Foreign Application Priority Data
Feb. 14, 2019 (EP) .................................... 19157173

(51) Int. Cl.
*H05B 47/17* (2020.01)
*G05B 15/02* (2006.01)
(Continued)

(52) U.S. Cl.
CPC ............. *H05B 47/17* (2020.01); *G05B 15/02* (2013.01); *H05B 47/115* (2020.01); *H05B 47/155* (2020.01)

(58) Field of Classification Search
CPC .... H05B 47/115; H05B 47/19; H05B 47/175; H05B 47/155; H05B 47/105; H05B 47/125; H05B 45/20; H05B 47/13; H05B 47/10
See application file for complete search history.

(56) References Cited

U.S. PATENT DOCUMENTS

| 2015/0081376 A1 | 3/2015 | Cardone et al. |
| 2016/0112240 A1 | 4/2016 | Sundaresan et al. |

(Continued)

FOREIGN PATENT DOCUMENTS

| CN | 1573757 A | 2/2005 |
| CN | 106507159 A | 3/2017 |

(Continued)

*Primary Examiner* — Wei (Victor) Y Chan

(57) ABSTRACT

A method of controlling one or more devices (13) of a plurality of devices (13,15) associated with a control system comprises a control system (1) receiving input signals from at least one device (15) of the plurality of devices, determining events from the input signals, transmitting the events to a further system (26), receiving control commands destined for the one or more devices from the further system, and transmitting output signals representing the control commands to the one or more devices. The method further comprises determining a relationship between the events and the control commands, establishing a new rule based on the determined relationship, receiving a new input signal from the at least one device, determining a new event from the new input signal, and controlling the one or more devices according to the rule in dependence on the new event.

13 Claims, 6 Drawing Sheets

(51) Int. Cl.
    *H05B 47/115*     (2020.01)
    *H05B 47/155*     (2020.01)

(56) References Cited

U.S. PATENT DOCUMENTS

| | | | |
|---|---|---|---|
| 2016/0360594 A1* | 12/2016 | Chemel | H05B 47/105 |
| 2016/0360954 A1 | 12/2016 | Chemel | |
| 2017/0231063 A1* | 8/2017 | Nolan | G06V 40/19 |
| 2018/0034655 A1 | 2/2018 | Christopher et al. | |

FOREIGN PATENT DOCUMENTS

| | | |
|---|---|---|
| CN | 107111288 A | 8/2017 |
| CN | 107113544 A | 8/2017 |
| CN | 107926099 A | 4/2018 |
| WO | 2017029063 A1 | 2/2017 |
| WO | 2018007450 A1 | 1/2018 |
| WO | 2018053041 A1 | 3/2018 |
| WO | 2018127427 A1 | 7/2018 |
| WO | 20191495948 A1 | 8/2019 |

* cited by examiner

IMPROVING AUTOMATION RULES BY DETERMINING A RELATIONSHIP BETWEEN EVENTS AND CONTROL COMMANDS

CROSS-REFERENCE TO PRIOR APPLICATIONS

This application is the U.S. National Phase application under 35 U.S.C. § 371 of International Application No. PCT/EP2020/053441, filed on Feb. 11, 2020, which claims the benefit of European Patent Application No. 19157173.6, filed on Feb. 14, 2019. These applications are hereby incorporated by reference herein.

FIELD OF THE INVENTION

The invention relates to a control system for controlling one or more of a plurality of devices associated with said control system and improving the execution of automation rules, said one or more devices being controlled in response to events determined from input signals received from at least one of said plurality of devices.

The invention further relates to a method of controlling one or more of a plurality of devices associated with said control system and improving the execution of automation rules, said one or more devices being controlled in response to events determined from input signals received from at least one of said plurality of devices.

The invention also relates to a computer program product enabling a computer system to perform such a method.

BACKGROUND OF THE INVENTION

Connected lighting systems such as the Philips Hue system are becoming smarter due to an increasing number of accessories such as motion sensors and wireless light switches. By allowing a user to configure rules for controlling his local lighting devices based on time and/or based on input from accessories, e.g. switch on light in room X if button Y is pressed, the user can automate the control of his local lighting devices to a large extent.

Automating lighting control can sometimes result in behavior with undesired side effects. For example, WO 2018/127427 A1 addresses the problem that the execution of automation rules can cause stress to a user. WO 2018/127427 A1 discloses a lighting control system which comprises a suppression component configured to detect a condition of increased user stress based on activity monitoring, identify at least one of the automation rules as a potential cause of the increased user stress, and suppress or modify the identified automation rule for at least one of the luminaires based thereon.

Certain connected lighting systems such as the Philips Hue system allow a user to have external clients such as Amazon Echo, Google Home, and Apple TV control his local lighting devices. This control may be realized entirely locally or may be realized via the cloud. More and more of these clients can also be setup to control the local lighting devices automatically based on automation rules. Typically, an external client is able to subscribe to events from the connected lighting system. The more events are exported by the connected lighting system, the more automated behavior can be offered by these external clients.

However, a drawback of external clients is that they sometimes respond noticeably slow and are affected by Internet outages and the automated rules are thus not always performed reliably.

SUMMARY OF THE INVENTION

It is a first object of the invention to provide a control system for controlling one or more of a plurality of devices associated with said control system, which performs automated rules in a more reliable manners.

It is a second object of the invention to provide a method for controlling one or more of a plurality of devices associated with a control system, which can be used to perform automated rules in a more reliable manners.

In a first aspect of the invention, a control system for controlling one or more of a plurality of devices associated with said control system and improving the execution of automation rules, said one or more devices being controlled in response to events determined from input signals received from at least one of said plurality of devices, comprises at least one input interface, at least one output interface, and at least one processor configured to use said at least one input interface to receive input signals from said at least one device, determine events from said input signals, use said at least one output interface to transmit said events to a further system (i.e. the external client), use said at least one input interface to receive control commands destined for said one or more devices from said further system, and use said at least one output interface to transmit output signals representing said control commands to said one or more devices.

Said at least one processor is further configured to determine a relationship between said events and said control commands, establish a new rule based on said determined relationship, use said at least one input interface to receive a new input signal from said at least one device, determine a new event from said new input signal, and use said at least one output interface to control said one or more devices according to said rule in dependence on said new event.

By recognizing the automated behavior realized by external clients and replacing this automated behavior by the same or similar behavior in the local control system whenever possible, response time and availability of the automated behavior may be improved, especially when the automation rules are moved from a cloud environment (e.g. iCloud, google cloud, or amazon cloud) to the local control system. This includes up/down link latency as well as temporary ISP or modem outages.

One or more of said events may represent a change in device status, a motion sensor trigger or a button press, for example. Said one or more devices may include one or more lighting devices. Said at least one device may include at least one lighting control device. Said control system may be part of a lighting system which comprises one or more of said plurality of devices.

Said at least one processor may be configured to use said at least one output interface to propose said establishment of said new rule to a user, use said at least one input interface to receive a response to said proposal and establish said new rule in dependence on said response. By asking a user to agree to the establishment of the new rule, it may be prevented that the user is unpleasantly surprised by the establishment of the new rule, e.g. when the user wants to manually edit an external rule on the further system only to discover that it no longer exists.

Said at least one processor may be configured to remove an external rule used by said further system, said external rule corresponding to said new rule. This is beneficial in case the control system is able to access the configuration on the further system and may prevent that the user has to manually change a configuration of the further system.

Said at least one processor may be configured to determine a measure of a reliability of said relationship and establish said new rule based on said relationship in dependence on said reliability measure. This ensures that a minimum threshold of certainty is met of the rule having been determined correctly. Said measure of reliability may depend on the number of times the relationship is detected and/or on a time difference and/or time difference variation between the events and control commands that might be triggered by these events, for instance.

As a first example, if it is determined only once that a light is activated immediately following a presence detection event, then it may be the user that immediately activated the light manually when he entered the room and the network conditions may have been exceptionally good at that time. As a second example, if it is determined that a light is frequently activated following a presence detection event, but the time differences between the events and the control commands are relatively large and/or vary per occurrence, then it may be a user that consistently activates the light when he enters the room.

Said at least one processor may be configured to use said at least one input interface to receive further events from another control system, said control system being subscribed to said further events and said other control system being configured to determine said further events from further input received from at least one device associated with said other control system, and determine said relationship further based on said further events. This other control system may be a system for controlling blinds. If an external client transmits control commands to both the control system and the other control system, e.g. to close blinds and increase light output, in response to input from a device, e.g. a light sensor, then this information may help find relationships between events and control commands and/or to establish a rule that replaces all of the automated behavior and not just a part of it.

Said at least one processor may be configured to identify based on said events and said control commands an existing rule used by said control system which conflicts with an external rule and use said at least one output interface to propose removal of said existing rule or said external rule, said external rule being used by said further system. In this way, conflicting behavior between the control system and one or more external clients and between the external clients themselves may be prevented.

In a second aspect of the invention, a method of controlling one or more of a plurality of devices associated with a control system and improving the execution of automation rules, said one or more devices being controlled in response to events determined from input signals received from at least one of said plurality of devices, comprises receiving input signals from said at least one device, determining events from said input signals, transmitting said events to a further system, receiving control commands destined for said one or more devices from said further system, and transmitting output signals representing said control commands to said one or more devices.

Said method further comprises determining a relationship between said events and said control commands, establishing a new rule based on said determined relationship, receiving a new input signal from said at least one device, determining a new event from said new input signal, and controlling said one or more devices according to said rule in dependence on said new event. Said method may be performed by software running on a programmable device. This software may be provided as a computer program product.

Said method may further comprise proposing said establishment of said new rule to a user and receiving a response to said proposal, wherein said new rule is established in dependence on said response.

Said method may further comprise removing an external rule used by said further system, said external rule corresponding to said new rule.

Said method may further comprise determining a measure of a reliability of said relationship, wherein said new rule is established based on said relationship in dependence on said reliability measure.

Said method may further comprise identifying based on said events and said control commands an existing rule which conflicts with an external rule and proposing removal of said existing rule or said external rule, said external rule being used by said further system.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling one or more of a plurality of devices associated with a control system and improving the execution of automation rules, said one or more devices being controlled in response to events determined from input signals received from at least one of said plurality of devices.

The executable operations comprise receiving input signals from said at least one device, determining events from said input signals, transmitting said events to a further system, receiving control commands destined for said one or more devices from said further system, and transmitting output signals representing said control commands to said one or more devices.

The executable operations further comprise determining a relationship between said events and said control commands, establishing a new rule based on said determined relationship, receiving a new input signal from said at least one device, determining a new event from said new input signal, and controlling said one or more devices according to said rule in dependence on said new event.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
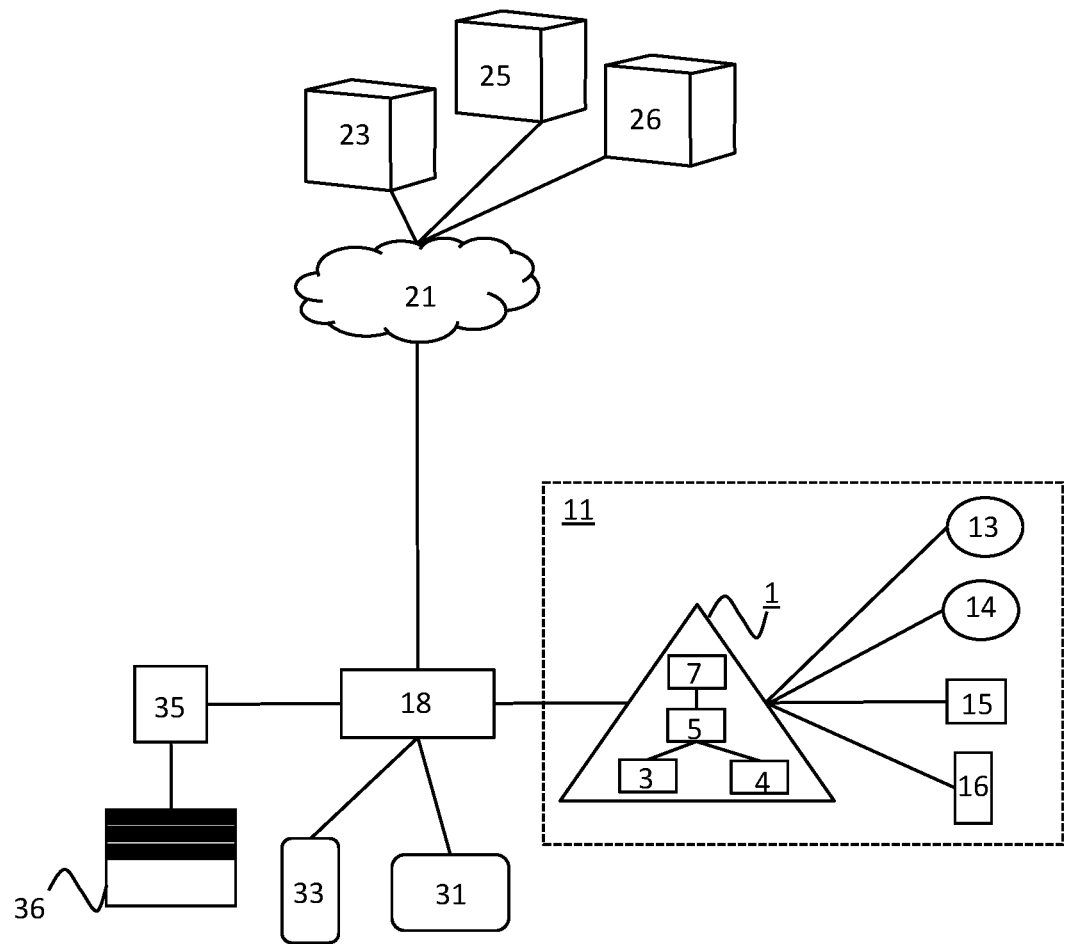
FIG. 1 is a block diagram of an embodiment of the control system.

FIG. 1 shows an embodiment of the control system for controlling one or more of a plurality of devices associated with the control system: a bridge 1. The plurality of devices comprises lighting devices 13 and 14, a presence sensor 15 and a wireless light switch 16. The bridge 1 controls the lighting devices 13 and 14 in response to events determined from input signals received from lighting control devices: presence sensor 15 and wireless light switch 16.

The bridge 1 transmits events to Internet servers 25 and 26 via an intermediary Internet server 23 and to a local user device 31. Internet servers 25 and 26 and local user device 31 run automation clients which are subscribed to receive these events. The Internet servers 25 and 26 provide cloud services, e.g. the Google Home cloud service and the Alexa cloud service. The cloud services typically communicate with a further local user device 33 in the same spatial area as the bridge 1, e.g. a Google Home device or Amazon Echo device. The local user device 31 may be an Apple TV device, for example.

The Internet servers 25 and 26 and the intermediary Internet server 23 are connected to the Internet (backbone) 21. A lighting system 11 comprises the bridge 1, lighting devices 13 and 14, presence sensor 15 and wireless light switch 16. The bridge 1 is connected to the wireless LAN access point 18, e.g. via Ethernet. The bridge 1 communicates with the lighting devices 13 and 14, presence sensor 15 and wireless light switch 16, e.g. using Zigbee technology. The lighting devices 13 and 14 may be Philips Hue lights, for example. The presence sensor 15 may be a Hue motion sensor, for example. The wireless light switch 16 may be Hue tap switch or a Hue dimmer switch, for example. The local user device 31 and the further local user device 33 are also connected to the wireless LAN access point 18, e.g. via Wi-Fi (IEEE 802.11).

The bridge 1 comprises a receiver 3, a transmitter 4, a processor 5, and a memory 7. The processor 5 is configured to use the receiver 3 to receive input signals from the presence sensor 15 and the wireless switch 16, determine events from the input signals, use the transmitter 4 to transmit the events to the Internet server 25 and/or the Internet server 26, use the receiver to receive control commands destined for the presence sensor 15 and/or the wireless switch 16 from the Internet server 25 and/or the Internet server 26, and use the transmitter 4 to transmit output signals representing the control commands to the presence sensor 15 and/or the wireless switch 16. The events may represent a change in device status, a motion sensor trigger or a button press, for example.

The processor 5 is further configured to determine a relationship between the events and the control commands, establish a new rule based on the determined relationship, use the receiver 3 to receive a new input signal from the presence sensor 15 or the wireless switch 16, determine a new event from the new input signal, and use the transmitter 4 to control the lighting device 13 and/or the lighting device 14 according to the rule in dependence on the new event.

In the embodiment of FIG. 1, the processor 5 is configured to use the receiver 3 to receive further events from another control system: the blind control system 35. The bridge 1 subscribes to the further events from the blind control system 35 and the blind control system 35 is configured to determine the further events from further input received from blinds 36 associated with the blind control system 35. The bridge 1 determines the relationship further based on the further events.

If the Internet server 25 and/or the Internet server 26 transmits control commands to both the bridge 1 and the blind control system 35, e.g. to close blinds and increase light output, in response to input from a device, e.g. a light sensor, then this information may help find relationships between events and control commands and/or to establish a rule that replaces all of the automated behavior and not just a part of it.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g. ARM-based, or an application-specific processor. The processor 5 of the bridge 1 may run a Unix-based operating system for example. The memory 7 may comprise one or more memory units. The memory 7 may comprise one or more hard disks and/or solid-state memory, for example. The memory 7 may be used to store a table of connected devices, for example.

The receiver 3 and the transmitter 4 may use one or more wired or wireless communication technologies such as Ethernet to communicate with the wireless LAN access point 18, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The bridge 1 may comprise other components typical for a network device such as a power connector. The invention may be implemented using a computer program running on one or more processors.

In the embodiment of FIG. 1, the system for controlling one or more of a plurality of devices associated with the control system is a bridge. In an alternative embodiment, the system may be a different type of system, e.g. a lighting device or accessory. In the embodiment of FIG. 1, the system for controlling one or more of a plurality of devices associated with the control system consists of only one device. In an alternative embodiment, the system comprises multiple devices.

Figure 2:
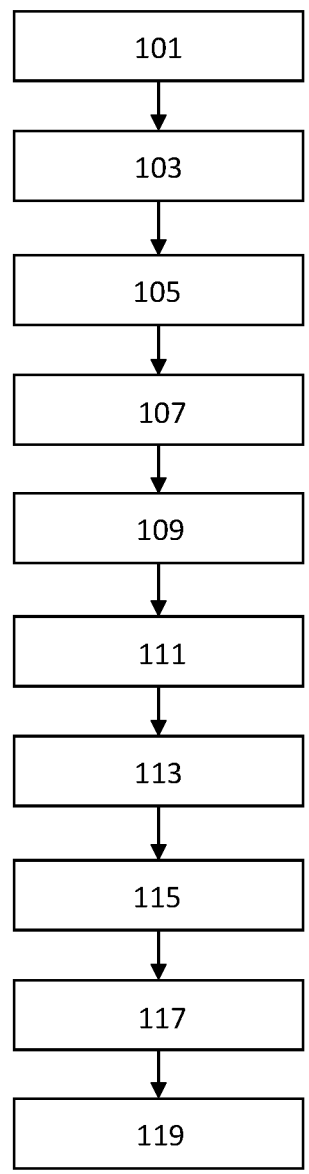
FIG. 2 is a flow diagram of a first embodiment of the method.

A first embodiment of the method of controlling one or more of a plurality of devices associated with a control system is shown in FIG. 2. The one or more devices are controlled in response to events determined from input signals received from at least one of the plurality of devices. A step 101 comprises receiving input signals from the at least one device. A step 103 comprises determining events from the input signals.

The events may be determined by simply extracting them from the input signals, e.g. if a presence sensor transmits an event as soon as the amount of motion within a user-configured distance of the presence sensor exceeds a threshold. Alternatively, the events may be determined by analyzing data in the input signals, e.g. if a presence sensor transmits raw data. This raw data may include, for example, the detected amount of motion and/or the distance at which motion is detected, and this may be analyzed by comparing this with one or more thresholds.

In the embodiment of FIG. 2, step 103 further comprises logging the determined events, e.g. storing them in a memory associated with timestamps reflecting the time at which the input signals were received. A step 105 comprises transmitting the events to a further system.

A step 107 comprises receiving control commands destined for the one or more devices from the further system. Steps 107 comprises logging the received control commands, e.g. storing them in the memory associated with timestamps reflecting the time at which the control commands were received. A step 109 comprises transmitting output signals representing the control commands to the one or more devices.

A step 111 comprises determining a relationship between the events and the control commands. Step 111 comprises analyzing the log on recurring patterns. The events and control commands are preferably ordered in chronological order in the log. In the embodiment of FIG. 2, the analysis is performed in real-time. Recurring behavior such as "in the past day a motion event in the hallway (while the light level was below X) was followed by a light in hallway switched on" and "no more motion in the hallway was followed by a light in hallway switched off" may be detected in step 111.

These patterns may be flagged. Whenever the user interacts with the system, e.g. the Philips Hue system, though a UI, like a mobile app, he or she may be informed of better alternatives. Step 111 may further comprise determining a relationship between the control commands and fixed times, e.g. whether a certain control command is always received at fixed times, e.g. at 9 am, near sun-set or near sun-rise.

A step 113 comprises establishing a new rule based on the determined relationship. Step 113 comprises identifying behavior that can be realized locally and establishing a new rule for this behavior. Step 113 may further comprise identifying already existing local rules which operate on the same events and/or control the same lighting devices, i.e. conflicting behavior. Information about the new rule and/or the conflicting rules may be presented to the user, e.g. on the next UI contact when the user starts his mobile app. If conflicting behavior is identified that involves an existing local rule, then no new rule is established for this conflicting behavior. In an alternative embodiment, detection of conflicting behavior may be performed in a separate step, which may be performed before steps 111 and 113 are performed, for example.

A step 115 comprises receiving a new input signal from the at least one device. A step 117 comprises determining a new event from the new input signal. A step 119 comprises controlling the one or more devices according to the rule in dependence on the new event.

Figure 3:
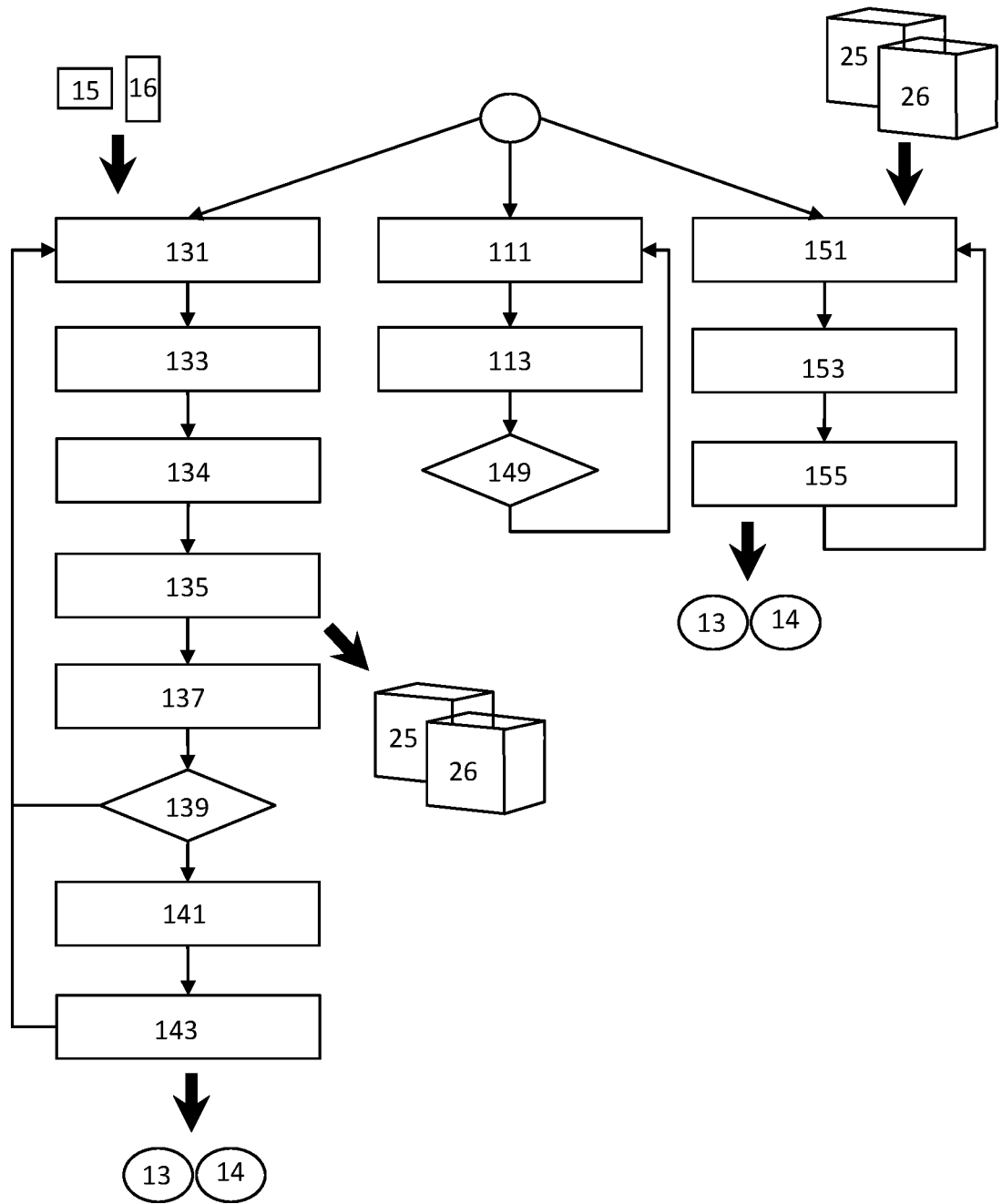
FIG. 3 is a flow diagram of a second embodiment of the method.

A second embodiment of the method of controlling one or more of a plurality of devices associated with a control system is shown in FIG. 3. In the embodiment of FIG. 3, three processes run in parallel. In the first process, a step 131 is performed first. Step 131 comprises receiving an input signal from presence sensor 15 or wireless light switch 16 of FIG. 1. A step 133 comprises determining one or more events from the input signal.

A step 134 comprises logging the determined one or more events in a log. A step 135 comprises determining which systems have subscribed to one or more of the determined event(s) and transmitting these one or more events to these systems, e.g. Internet server 25 and/or Internet server 26. A step 137 comprises determining whether the one or more events cause the conditions of one or more stored rules to be met. If it is determined in step 139 that this is the case, then step 141 is performed. If not, step 131 is repeated in order to receive the next input signal at a later time.

Step 141 comprises generating lower-level control commands for performing the actions that are associated with the rules whose conditions are met. A step 143 comprises determining which of lighting devices 13 and 14 are associated with the rules whose conditions are met and transmitting output signals corresponding to the generated lower-level control commands to this lighting device or these lighting devices. Step 131 is repeated after step 143 in order to receive the next input signal at a later time.

In the second process, a step 151 is performed first. Step 151 comprises receiving a control command destined for lighting device 13 and/or lighting device 14 from the Internet server 25 or the Internet server 26. A step 153 comprises logging the received control command in the log. A step 153 comprises transmitting one or more output signals representing the received control command to the lighting device 13 and/or lighting device 14. In the embodiment of FIG. 3, the control commands received from the Internet server 25 and/or the Internet server 26 are higher-level control commands and the output signals comprise lower-level control commands. Step 151 is repeated after step 155 in order to receive the next control command at a later time.

In the third process, step 111 of FIG. 2 is performed first. Step 111 comprises determining one or more relationships between the events and control commands received from the Internet server 25 and the Internet server 26 by analyzing the log. In the embodiment of FIG. 3, the analysis is performed offline. Step 113 comprises establishing one or more new rules in the stored rules based on the determined one or more relationships. Step 149 comprising waiting for a predefined time period to elapse after which step 111 is repeated.

Figure 4:
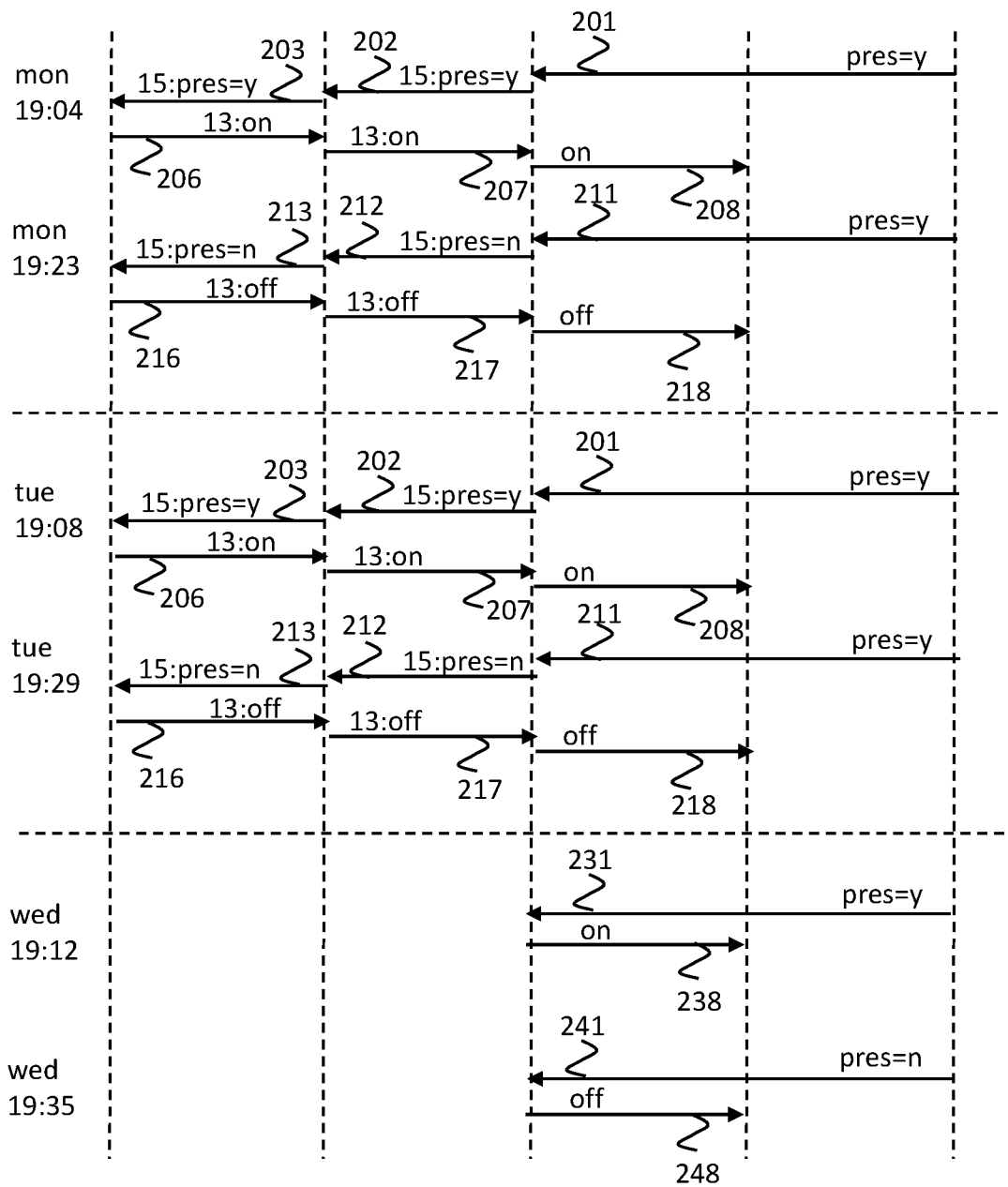
FIG. 4 depicts an example of the performance of the method of FIG. 3.

FIG. 4 depicts an example of the performance of the method of FIG. 3. Monday at 19:04, the presence sensor 15 transmits a signal 201 to bridge 1 indicating that presence has been detected. Bridge 1 then extracts this event from the signal 201 and determines that Internet server 26 has been subscribed to receive events from the presence sensor 15. Bridge 1 then stores this event in a log and transmits this event to the intermediary Internet server 23 in signal 202.

The signals from the bridge 1 to the intermediary Internet server 23 identify which device has changed status and comprise one or more new values for one or more attributes. In this case, the signal 202 indicates that presence has been detected by sensor device 15 and that the value of the attribute "presence" is "yes". For example, the signal 202 may comprise the event "/sensors/1/presence:yes". The intermediary Internet server 23 then forwards this event, e.g. using another protocol, to the Internet server 26 as signal 203.

Upon receipt of signal 203, the Internet server 26 then determines that the event causes the conditions of a ruled stored on the Internet server 26 to be met. This rule specifies that the light source of the lighting device 13 should be on as long as presence is detected by the sensor device 15. The Internet server 26 therefore transmits a signal 206 comprising a higher-level control command to the intermediary Internet server 23. This higher-level control command identifies the lighting device 13, e.g. "lights/1", and specifies the action to be performed, e.g. "turn on" to turn on the light source of the lighting device 13. The intermediary Internet server 23 forwards this higher-level control command, e.g. using another protocol, to the bridge 1 as signal 207.

Upon receipt of the signal 207, the bridge 1 translates the received higher-level command to a lower-level command, e.g. by translating the identifier "lights/1" to a Zigbee address, and stores the command in the log. The bridge 1 then transmits a signal 208, e.g. a Zigbee message, representing the lower-level command to the lighting device 13.

Monday at 19:23, the presence sensor 15 transmits a signal 211 to bridge 1 indicating that presence is no longer detected. Bridge 1 then extracts this event from the signal 211 and determines that Internet server 26 has been subscribed to receive events from the presence sensor 15. Bridge 1 then stores this event in a log and transmits this event to the intermediary Internet server 23 in signal 212.

The signal 212 indicates that sensor device 15 has changed status and that the value of the attribute "presence" of sensor device 15 is "no", i.e. that presence is no longer being detected by sensor device 15. For example, the signal 212 may comprise the event "/sensors/1/presence:no". The intermediary Internet server 23 then forwards this event, e.g. using another protocol, to the Internet server 26 as signal 213.

Upon receipt of signal 213, the Internet server 26 then determines that the event causes the conditions of a ruled stored on the Internet server 26 to no longer be met. This rule specifies that the light source of the lighting device 13 should be on as long as presence is detected by the sensor device 15. Instead of this single rule, two rules could be used: one rule to turn on the light source of lighting device 13 and one rule to turn off the light source of the lighting device 13. In an embodiment of the Internet server 26 that only accepts the latter type of rules, the Internet server 26 only needs to determine whether the conditions of rules are met and not whether the conditions of rules are no longer met.

The Internet server 26 then transmits a signal 216 comprising a higher-level control command to the intermediary Internet server 23. This higher-level control command identifies the lighting device 13, e.g. "lights/1", and specifies the action to be performed, e.g. "turn off" to turn off the light source of the lighting device 13. The intermediary Internet server 23 forwards this higher-level control command, e.g. using another protocol, to the bridge 1 as signal 217.

Upon receipt of the signal 217, the bridge 1 translates the received higher-level command to a lower-level command, e.g. by translating the identifier "lights/1" to a Zigbee address, and stores the command in the log. The bridge 1 then transmits a signal 218, e.g. a Zigbee message, representing the lower-level command to the lighting device 13.

The same signal transmissions occur on Tuesday, but on Tuesday, presence is detected at 19:08 instead of 19:04 and presence is no longer detected at 19:29 instead of 19:23.

In the embodiment of FIG. 4, the bridge 1 analyzes the log every night at midnight. Since the same behaviors have been detected twice and the minimally required reoccurrence is two, the bridge 1 determines that there is an external rule which specifies that the light source of the lighting device 13 should be on as long as presence is detected by the sensor device 15. The bridge 1 then establishes one or more new rules to replace the external rule. The external rule is either removed by the bridge 1 or removed by the user manually. This is not shown in FIG. 4.

Wednesday at 19:12, the presence sensor 15 transmits a signal 231 to bridge 1 indicating that presence has been detected. Bridge 1 then extracts this event from the signal 231 and stores this event in a log. Since the external rule that was removed was the only external rule that depended on the status of the presence sensor 15, the Internet server 26 is no longer subscribed to receive events from the presence sensor 15.

The bridge 1 further determines that the event causes the conditions of a rule stored on the bridge 1 to be met. This rule specifies that the light source of the lighting device 13 should be on as long as presence is detected by the sensor device 15 or that the light source of the lighting device 13 should be turned on when presence is detected by the sensor device 15. The bridge 1 therefore transmits a signal 238, e.g. a Zigbee message, representing a lower-level command to the lighting device 13. The lower-level command commands the lighting device 13 to turn on its light source.

Wednesday at 19:35, the presence sensor 15 transmits a signal 241 to bridge 1 indicating that presence is no longer detected. Bridge 1 then extracts this event from the signal 241 and stores this event in a log. Since the external rule that was removed was the only external rule that depended on the status of the presence sensor 15, the Internet server 26 is no longer subscribed to receive events from the presence sensor 15.

The bridge 1 further determines that the event causes the conditions of a rule stored on the bridge 1 to be met or to be no longer met. This rule specifies that the light source of the lighting device 13 should be on as long as presence is detected by the sensor device 15 or that the light source of the lighting device 13 should be turned off when presence is no longer detected by the sensor device 15. The bridge 1 therefore transmits a signal 248, e.g. a Zigbee message, representing a lower-level command to the lighting device 13. The lower-level command commands the lighting device 13 to turn off its light source.

Figure 5:
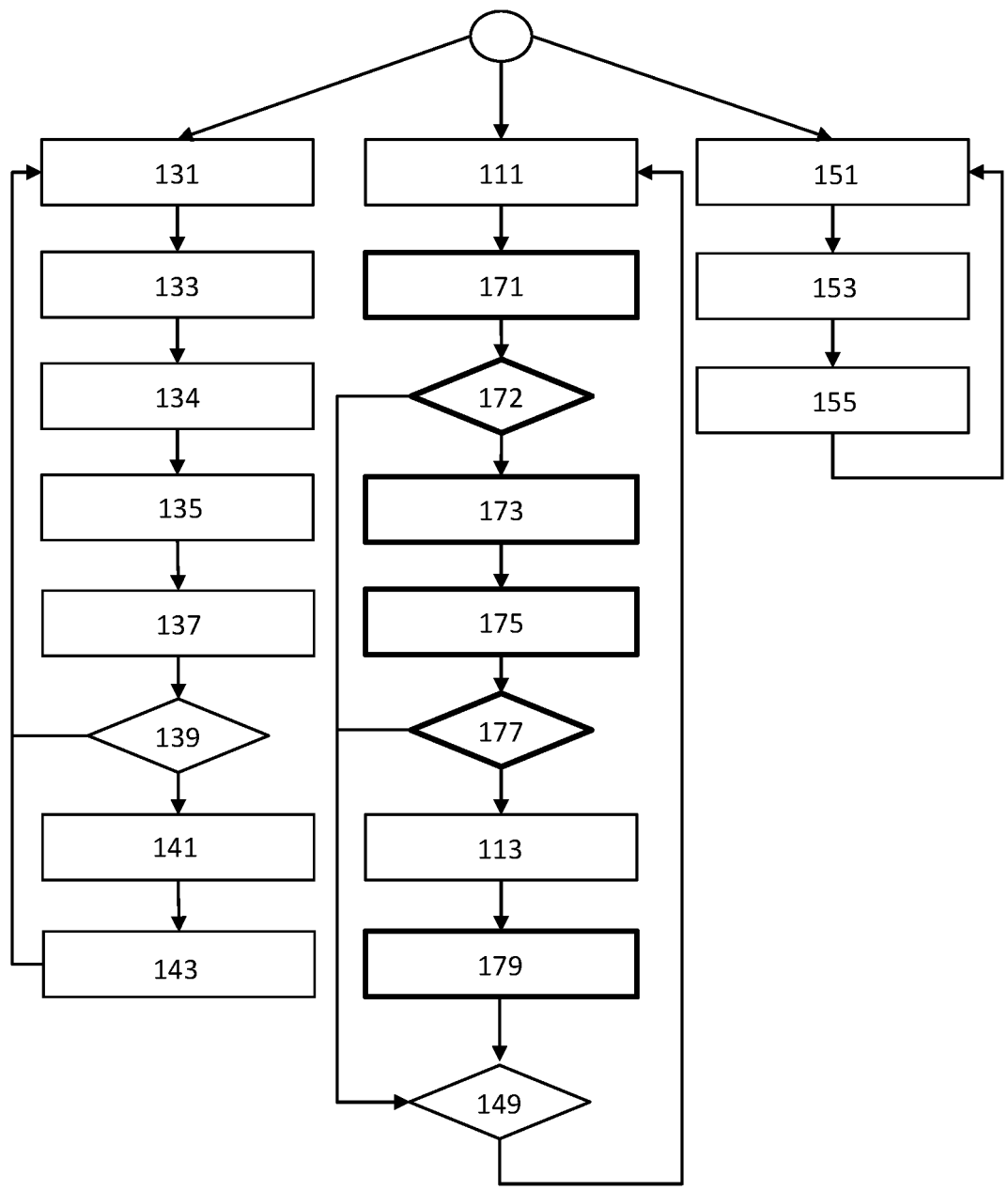
FIG. 5 is a flow diagram of a third embodiment of the method.

A third embodiment of the method of controlling one or more of a plurality of devices associated with a control system is shown in FIG. 5. In the embodiment of FIG. 5, additional steps are performed in the third process (which starts with step 111) compared to the embodiment of FIG. 3.

After one or more relationships between the logged events and logged control commands is determined in step 111, a step 171 is performed. Step 171 comprises determining a measure of a reliability of the relationship. The measure of reliability may depend on the number of times the relationship is detected and/or on a time difference and/or time difference variation between the events and control commands that might be triggered by these events, for instance.

As a first example, if it is determined only once that a light is activated immediately following a presence detection event, then it may be the user that immediately activated the light manually when he entered the room and the network conditions may have been exceptionally good at that time. As a second example, if it is determined that a light is frequently activated following a presence detection event, but the time differences between the events and the control commands are relatively large and/or vary per occurrence, then it may be a user that consistently activates the light when he enters the room.

In a step 172, this measure is compared with a threshold reflecting a minimally required reliability and if this threshold is exceeded, a step 173 is performed. If this threshold is not exceeded, then step 141 is performed next and the steps between steps 172 and 141 are skipped. Thus, the new rule is established in step 113 in dependence on the reliability measure.

Step 173 comprises proposing the establishment of the new rule to a user. A step 175 comprises waiting for a response to the proposal. A step 177 is performed after step 175. Step 177 is performed immediately if a response is received in step 175. If no response is received within a predefined time period, step 177 is performed as well. If it is determined in step 177 that a positive response was received in step 175, step 113 is performed. If no response or a negative response was received in step 175, then step 113 is skipped and step 141 is performed next. Thus, the new rule is established in step 113 in dependence on the response.

Step 113 comprises establishing one or more new rules based on the determined one or more relationships. Step 179 comprises removing one or more external rules used by the Internet server 25 and/or the Internet server 26 that correspond to the one or more new rules. Step 149 comprising waiting for a predefined time period to elapse after which step 111 is repeated.

In the embodiment of FIG. 5, an external rule is only removed if it is replaced by a new rule. In an alternative embodiment, an external rule may also be removed if an existing rule is found in the stored rules with which the external rule conflicts. For example, recognizing multiple active "hallway" behaviors may trigger a user notification to inquire if this is intentional. Other examples of conflicting behavior are:

The same wireless light switch or sensors are used to switch on the same set of lights (the user tried to automate twice via different solutions).

The same lights are controlled by similar time events, e.g. IFTTT (from IFTTT Inc.) or Google Home switches lights off at 11:00 p.m. while a local behavior "go-to-sleep" (gradually dimming) is set from 10:45 to 11:15 p.m. for these lights.

The same lights are controlled by similar time events, e.g. IFTTT or google Home switches lights off at 11:00 p.m. while a local behavior "switch-off at sunset" is used for these lights.

In the embodiment of FIG. 3, the external rule is manually removed by the user. In this case, if conflicting behavior is recognized, a hint may be provided to the user to remove the external rule or the local rule.

Figure 6:
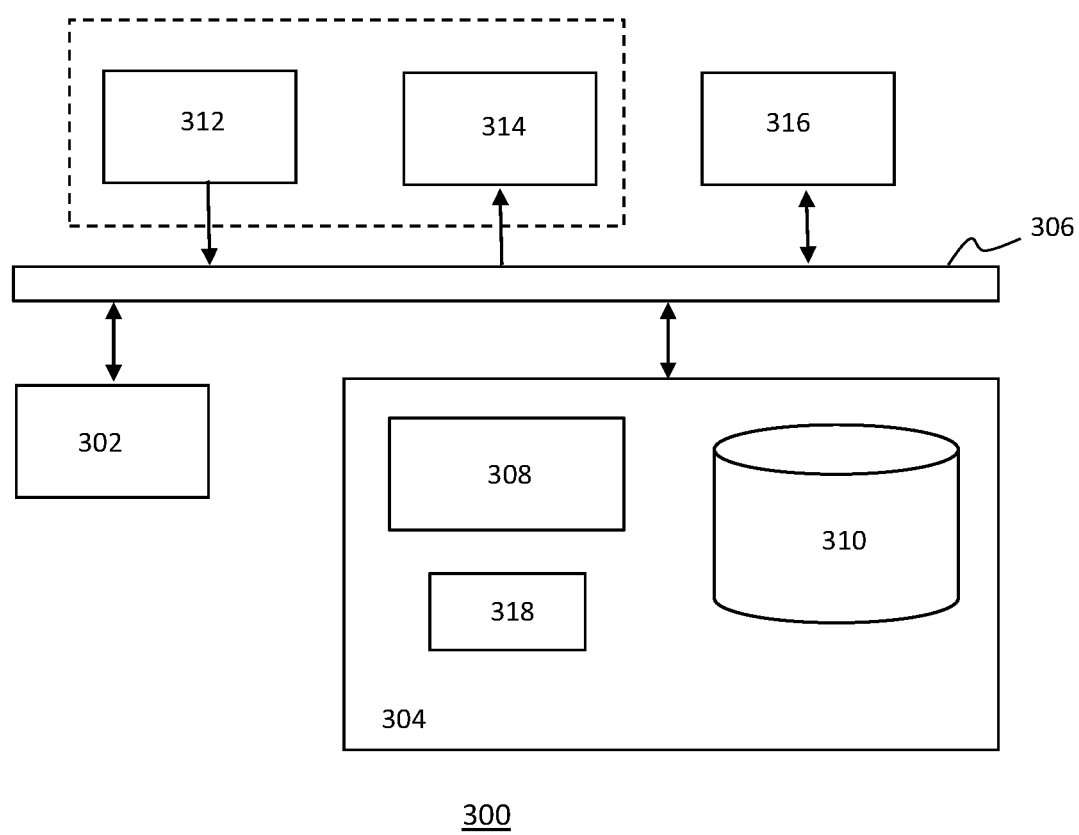
FIG. 6 is a block diagram of an exemplary data processing system for performing the method of the invention.

FIG. 6 depicts a block diagram illustrating an exemplary data processing system that may perform the method as described with reference to FIGS. 2,3 and 5.

As shown in FIG. 6, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 6 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 6, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 6) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

What is claimed is:

1. A control system for controlling one or more of a plurality of devices associated with said control system and for improving the execution of automation rules by replacing automated behavior of an external client of the control system by same behavior performed by said control system, said one or more devices being controlled in response to events determined from input signals received from at least one of said plurality of devices, said control system comprising:
   at least one input interface;
   at least one output interface; and
   at least one processor configured to:
      use said at least one input interface to receive input signals from said at least one device,
      determine events from said input signals,
      use said at least one output interface to transmit said events to said external client, which is subscribed to said events,
      use said at least one input interface to receive control commands from said external client destined for said one or more devices, and
      use said at least one output interface to transmit output signals representing said received control commands to said one or more devices,
   wherein said at least one processor is further configured to:
      determine, a relationship between at least one determined event transmitted to said external client and at least one subsequent control command received from said external client in response to the at least one determined event, wherein the relationship indicates that in response to when the at least one detected event is transmitted to the external client, the at least one subsequent control command is received from the external client;
   subsequent to determining the relationship, determine a plurality of reoccurrences of the relationship beyond a threshold amount;
      once the threshold amount is exceeded, establish a new rule based on said determined relationship, said new rule for causing said control system to perform said at least one subsequent control command upon a subsequent occurrence of the determined event without transmitting the subsequent occurrence of the determined event to the external client or receiving additional control commands from said external client,
      use said at least one input interface to receive a new input signal from said at least one device,
      determine a new occurrence of the event from said new input signal, and
      use said at least one output interface to control said one or more devices according to said new rule in dependence on said new occurrence of the event without receiving additional control commands from said external client.

2. The control system of claim 1, wherein said at least one processor is configured to use said at least one output interface to propose said establishment of said new rule to a user, use said at least one input interface to receive a response to said proposal and establish said new rule in dependence on said response.

3. The control system of claim 1, wherein said at least one processor is configured to remove an external rule used by said external client, said external rule corresponding to said new rule.

4. The control system of claim 1, wherein said one or more devices include one or more lighting devices.

5. The control system of claim 1, wherein said at least one device includes at least one lighting control device.

6. The control system of claim 1, wherein said at least one processor is configured to use said at least one input interface to receive further events from another control system, said control system being subscribed to said further events and said other control system being configured to determine said further events from further input received from at least one device associated with said other control system, and determine said relationship further based on said further events.

7. The control system of claim 1, wherein at least one of said events represent a change in device status, a motion sensor trigger or a button press.

8. The control system of claim 1, wherein said at least one processor is configured to identify based on said events and said control commands an existing rule used by said control system which conflicts with an external rule and use said at least one output interface to propose removal of said existing rule or said external rule, said external rule being used by said external client.

9. A method of controlling one or more of a plurality of devices associated with a control system and for improving the execution of automation rules by replacing automated behavior of an external client of the control system by behavior performed by said control system, said one or more devices being controlled in response to events determined from input signals received from at least one of said plurality of devices, said method comprising:
   receiving input signals from said at least one device;
   determining events from said input signals;
   transmitting said events to said external client, which is subscribed to said events;
   receiving control commands from said further system destined for said one or more devices; and
   transmitting output signals representing said received control commands to said one or more devices,
   wherein said method further comprises:
   determining a relationship between at least one determined event transmitted to said external client and at least one subsequent control command received from said external client in response to the at least one determined event, wherein the relationship indicates that in response to when the at least one detected event is transmitted to the external client, the at least one subsequent control command is received from the external client;
   subsequent to determining the relationship, determine a plurality of reoccurrences of the relationship beyond a threshold amount;

once the threshold amount is exceeded, establishing a new rule based on said determined relationship, said new rule for causing said control system to perform said at least one subsequent control command upon a subsequent occurrence of the determined event without transmitting the subsequent occurrence of the determined event to the external client or receiving additional control commands from said external client;

receiving a new input signal from said at least one device;

determining a new occurrence of the event from said new input signal; and controlling said one or more devices according to said new rule in dependence on said new occurrence of the event without receiving additional control commands from said external client.

10. The method of claim 9, further comprising proposing said establishment of said new rule to a user and receiving a response to said proposal, wherein said new rule is established in dependence on said response.

11. The method of claim 9, further comprising removing an external rule used by said external client, said external rule corresponding to said new rule.

12. The method of claim 9, further comprising identifying based on said events and said control commands an existing rule which conflicts with an external rule and proposing removal of said existing rule or said external rule, said external rule being used by said external client.

13. A non-transitory computer program or suite of computer programs comprising at least one software code portion or a computer program product storing at least one software code portion, the software code portion, when run on a computer system, being configured for enabling the method of claim 9 to be performed.

* * * * *